(12) United States Patent
Funk et al.

(10) Patent No.: US 8,651,773 B2
(45) Date of Patent: Feb. 18, 2014

(54) PROCESS FOR PNEUMATIC CONVEYING OF WATER-ABSORBING POLYMER PARTICLES

(75) Inventors: Rüdiger Funk, Niedernhausen (DE); Hermann Josef Feise, Kleinniedesheim (DE); Hanno Rüdiger Wolf, Heidelberg (DE)

(73) Assignee: BASF SE, Ludwigshafen (DE)

( * ) Notice: Subject to any disclaimer, the term of this patent is extended or adjusted under 35 U.S.C. 154(b) by 662 days.

(21) Appl. No.: 12/281,724

(22) PCT Filed: Mar. 6, 2007

(86) PCT No.: PCT/EP2007/052088
§ 371 (c)(1),
(2), (4) Date: Sep. 4, 2008

(87) PCT Pub. No.: WO2007/104673
PCT Pub. Date: Sep. 20, 2007

(65) Prior Publication Data
US 2009/0060660 A1    Mar. 5, 2009

(30) Foreign Application Priority Data
Mar. 14, 2006 (EP) .................................. 06111093

(51) Int. Cl.
*B65G 53/00* (2006.01)
(52) U.S. Cl.
USPC ........................................................ 406/197
(58) Field of Classification Search
USPC ........................................................ 406/197
See application file for complete search history.

(56) References Cited

U.S. PATENT DOCUMENTS

| | | | | |
|---|---|---|---|---|
| 3,384,420 A | * | 5/1968 | Fiscus | 406/173 |
| 3,709,562 A | * | 1/1973 | Feder | 406/109 |
| 4,319,848 A | * | 3/1982 | Lambertini et al. | 366/136 |
| 4,528,848 A | * | 7/1985 | Hafner | 73/218 |
| 4,755,178 A | * | 7/1988 | Insley et al. | 604/367 |
| 4,883,390 A | * | 11/1989 | Reintjes et al. | 406/24 |
| 4,904,440 A | * | 2/1990 | Angstadt | 264/517 |
| 4,908,175 A | * | 3/1990 | Angstadt | 264/113 |
| 4,927,582 A | * | 5/1990 | Bryson | 264/113 |
| 5,102,585 A | * | 4/1992 | Pieper et al. | 264/37.29 |
| 5,156,902 A | * | 10/1992 | Pieper et al. | 428/206 |
| 5,369,148 A | * | 11/1994 | Takahashi et al. | 523/315 |
| 5,429,788 A | * | 7/1995 | Ribble et al. | 264/510 |
| 5,516,585 A | * | 5/1996 | Young et al. | 428/372 |

(Continued)

FOREIGN PATENT DOCUMENTS

| | | |
|---|---|---|
| EP | 439 012 | 7/1991 |
| JP | 2004-345804 | 12/2004 |
| WO | WO-00/39009 | 7/2000 |
| WO | WO 2004/108795 | 12/2004 |

OTHER PUBLICATIONS

Ullmann's Encyclopedia of Industrial Chemistry, vol. 33, pp. 482-487 (6th ed. 2003).

*Primary Examiner* — Joseph Dillon, Jr.
(74) *Attorney, Agent, or Firm* — Marshall, Gerstein & Borun LLP

(57) ABSTRACT

A process for pneumatic delivery of water-absorbing polymer particles, the initial gas rate in the delivery being from 1 to 6 m/s and the delivery material loading being from 1 to 100 kg/kg.

16 Claims, 1 Drawing Sheet

(56) References Cited

U.S. PATENT DOCUMENTS

| | | | |
|---|---|---|---|
| 5,582,644 A * | 12/1996 | Gaddis et al. | 118/303 |
| 6,267,575 B1 * | 7/2001 | Rooyakkers et al. | 425/83.1 |
| 6,270,893 B1 * | 8/2001 | Young et al. | 428/372 |
| 6,648,558 B1 * | 11/2003 | Shultz | 406/195 |
| 6,727,345 B2 * | 4/2004 | Kajikawa et al. | 528/502 R |
| 6,890,373 B2 * | 5/2005 | Nemoto et al. | 95/90 |
| 7,199,211 B2 | 4/2007 | Popp et al. | |
| 7,250,481 B2 | 7/2007 | Jaworek et al. | |
| 7,259,212 B2 | 8/2007 | Popp et al. | |
| 7,405,321 B2 | 7/2008 | Riegel et al. | |
| 7,420,013 B2 | 9/2008 | Riegel et al. | |
| 8,410,223 B2 * | 4/2013 | Matsumoto et al. | 525/330.2 |
| 2002/0106461 A1 * | 8/2002 | Talton | 427/596 |
| 2003/0020199 A1 * | 1/2003 | Kajikawa et al. | 264/140 |
| 2003/0153457 A1 * | 8/2003 | Nemoto et al. | 502/402 |
| 2007/0225160 A1 * | 9/2007 | Kitano et al. | 502/402 |
| 2008/0161429 A1 * | 7/2008 | Felix | 521/28 |
| 2009/0215617 A1 * | 8/2009 | Kimura et al. | 502/402 |
| 2010/0066771 A1 * | 3/2010 | Hiratsuka et al. | 347/1 |
| 2010/0112200 A1 * | 5/2010 | Barthel et al. | 427/185 |
| 2010/0119312 A1 * | 5/2010 | Nagashima et al. | 406/46 |
| 2010/0249320 A1 * | 9/2010 | Matsumoto et al. | 524/832 |
| 2010/0273942 A1 * | 10/2010 | Funk et al. | 524/852 |
| 2011/0009590 A1 * | 1/2011 | Matsumoto et al. | 526/317.1 |
| 2011/0015351 A1 * | 1/2011 | Nogi et al. | 525/385 |
| 2011/0059329 A1 * | 3/2011 | Dobrawa et al. | 428/522 |
| 2011/0088806 A1 * | 4/2011 | Nogi et al. | 141/1 |

\* cited by examiner

US 8,651,773 B2

PROCESS FOR PNEUMATIC CONVEYING OF WATER-ABSORBING POLYMER PARTICLES

CROSS-REFERENCE TO RELATED APPLICATIONS

This is the U.S. national phase application of International Application No. PCT/EP2007/052088, filed Mar. 6, 2007, which claims the benefit of European Patent No. EP 06111093.8 filed Mar. 14, 2006.

TECHNICAL FIELD

The present invention relates to processes for pneumatic delivery of water-absorbing polymer particles, the initial gas rate in the delivery being from 1 to 6 m/s and the delivery material loading being from 1 to 100 kg/kg.

BACKGROUND

Water-absorbing polymers are especially polymers of (co)polymerized hydrophilic monomers, graft (co)polymers of one or more hydrophilic monomers on a suitable graft base, crosslinked cellulose ethers or starch ethers, crosslinked carboxymethylcellulose, partly crosslinked polyalkylene oxide or natural products swellable in aqueous liquids, for example guar derivatives. Such polymers, as products which absorb aqueous solutions, are used to produce diapers, tampons, sanitary napkins and other hygiene articles, but also as water-retaining agents in market gardening.

Water-absorbing polymers typically have a Centrifuge Retention Capacity of from 25 to 60 g/g, preferably of at least 30 g/g, preferentially of at least 32 g/g, more preferably of at least 34 g/g, most preferably of at least 35 g/g. The Centrifuge Retention Capacity (CRC) is determined according to the EDANA (European Disposables and Nonwovens Association) recommended test method No. 441.2-02 "Centrifuge Retention Capacity".

The preparation of water-absorbing polymers is described, for example, in "Modern Superabsorbent Polymer Technology", F. L. Buchholz and A. T. Graham, Wiley-VCH, 1998, pages 69 to 117. Water-absorbing polymer particles are preferably transported by means of pneumatic delivery systems. The mechanical stress which inevitably occurs leads to undesired attrition. Therefore, low transport speeds and hence reduced mechanical stresses are desirable.

In principle, a distinction can be drawn between three different delivery types in pneumatic conveying.

1. In the case of aerial delivery and stream delivery in the region of high gas rates, the laws of the free-flowing individual particle apply approximately. This is the classical type of pneumatic delivery. No product deposits whatsoever occur. There is essentially uniform delivery material distribution in the tube.
2. When the gas rate falls, the delivery moves into the range of strand delivery, where the delivery material flows in the lower half of the tube in particular. In the upper half of the tube, there is aerial delivery.
3. At low gas rates, the delivery proceeds extremely gently as dense stream delivery (plug delivery, impulse delivery) with high pressure drop.

JP-A-2004/345804 describes the dense stream delivery of water-absorbing polymer particles, with delivery gas additionally being metered into individual segments of the delivery line from the outside (secondary air).

It was an object of the present invention to provide an improved process for pneumatic delivery of water-absorbing polymer particles, in particular avoiding the complex use of secondary air via an external additional line.

DETAILED DESCRIPTION

Figure 1:
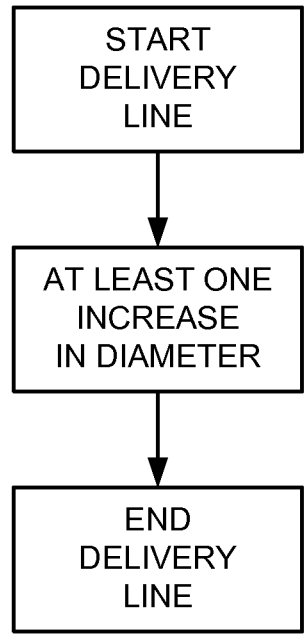
FIG. 1 is a schematic of the delivery line according to the present disclosure.
Figure 2:
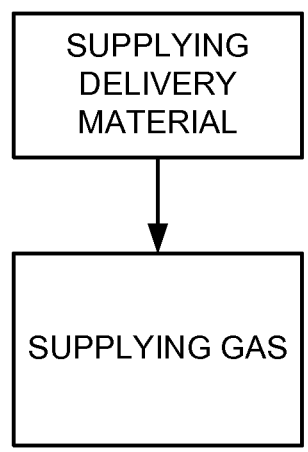
FIG. 2 is a block diagram of the method according to the present disclosure.

The object is achieved by a process for pneumatic delivery of water-absorbing polymer particles, wherein the initial gas rate in the delivery is from 1 to 6 m/s and the delivery material loading is from 1 to 100 kg/kg.

Excessively high or excessively low gas rates cause increased attrition and shift the particle size distribution of the transported water-absorbing polymer particles to lower values.

The initial gas rate in the delivery is preferably from 1.5 to 6 m/s, more preferably from 2 to 5 m/s, most preferably from 3 to 4 m/s, and, when a fluid advance line is used, preferably from 2 to 6 m/s, more preferably from 3 to 5.5 m/s, most preferably from 4 to 5 m/s.

A fluid advance line is an internal line with injection points, for example every 500 mm, through which an uncontrolled substream of the delivery gas can be conducted around the product stream branches between the injection points (bypass). The penetration of delivery material into the fluid advance line is prevented by baffles.

The delivery material loading of the pneumatic delivery is preferably from 1 to 100 kg/kg, more preferably from 5 to 75 kg/kg, most preferably from 10 to 50 kg/kg, the delivery material loading being the quotient of delivery material mass flow rate and gas mass flow rate.

The diameter of the pipeline in which the pneumatic delivery is carried out is preferably from 3 to 30 cm, more preferably from 4 to 25 cm, most preferably from 5 to 20 cm. Excessively low tube diameters lead to a higher mechanical stress as a result of the pneumatic delivery and hence promote the undesired attrition. Excessively large tube diameters enable an equally undesired settling of the water-absorbing polymer particles in the delivery line.

Since delivery gas is compressible, there is no constant pressure in the delivery line, but rather a higher pressure is present at the start than at the end. However, this increases the gas volume and with it the gas rate. In order to keep the delivery rate in the region of the optimal gas rate, the diameter of the delivery line, depending on its length, is preferably graduated in size at least once. This relates in particular to long delivery zones. There are preferably a plurality of graduations of the line diameter. In the most preferred embodiment of the present invention, conical delivery lines are used.

In a further preferred embodiment of the present invention, the delivery line may additionally be equipped with vibrators and/or tappers (vibration-induced pneumatic delivery).

Generally, it is possible to conduct the pneumatic delivery to perform the present invention either as suction delivery or as pressure delivery. The pressure in the delivery line relative to the environment is preferably from −0.8 to 10 bar.

In principle, considered at the same rate, pressure delivery can be operated with higher loadings than suction delivery, since the pressure reserves under elevated pressure are greater than under reduced pressure, and since the delivery gas density which drives the product onward increases with rising pressure. The pressure in the delivery line relative to the environment is therefore more preferably from 0.5 to 6 bar, most preferably from 1 to 4 bar.

In the case of pressure delivery, it is additionally possible to undertake the transport in delivery lines with relatively small tube cross section.

In order to minimize the mechanical stress, the number of curves in the pipeline of a pneumatic delivery system should be at a minimum, preferably fewer than 6, preferentially fewer than 5, more preferably fewer than 4, most preferably fewer than 3. A pipeline in a pneumatic delivery system is the section between the introduction unit for the water-absorbing polymer particles and the receiving vessel, i.e. the region in which the water-absorbing polymer particles are transported in the gas stream.

The water content of the water-absorbing polymer particles is preferably less than 10% by weight, more preferably less than 5% by weight, most preferably from 1 to 5% by weight, the water content being determined by the EDANA (European Disposables and Nonwovens Association) recommended test method No. 430.2-02 "Moisture content". The mechanical stability of the water-absorbing polymer particles decreases with the water content, i.e. the undesired attrition increases. Excessively high water contents during the pneumatic delivery can lead to plastic deformation of the polymer particles (formation of "angel hair") or lead to blockages.

The water-absorbing polymer particles preferably have a particle diameter of less than 1000 µm to an extent of at least 90% by weight, more preferably a particle diameter of less than 900 µm to an extent of at least 95% by weight, most preferably a particle diameter of less than 800 µm to an extent of at least 98% by weight.

The process according to the invention lowers the mechanical stress during the pneumatic delivery to such an extent that the proportion of polymer particles having a particle diameter of less than 150 µm is increased by the pneumatic delivery preferably by less than 1% by weight, more preferably by less than 0.7% by weight, most preferably by less than 0.5% by weight, based in each case on the total amount of polymer particles, and the permeability of the polymer particles falls preferably by less than $5\times10^{-7}$ cm$^3$s/g, more preferably by less than $4\times10^{-7}$ cm$^3$s/g, most preferably by less than $3\times10^{-7}$ cm$^3$s/g as a result of the pneumatic delivery.

The water-absorbing polymer particles useable in the process according to the invention can be prepared by polymerizing a monomer solution comprising a) at least one ethylenically unsaturated, acid-bearing monomer,
b) at least one crosslinker,
c) if desired one or more ethylenically and/or allylically unsaturated monomers copolymerizable with a) and
d) if desired one or more water-soluble polymers onto which monomers a), b) and if appropriate c) can be grafted at least partly, the resulting polymer being dried, classified, e) if desired aftertreated with at least one postcrosslinker, dried, thermally postcrosslinked and
f) if desired aftertreated with at least one polyvalent cation.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The content of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

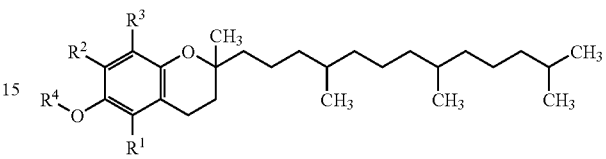

where $R^1$ is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

The water-absorbing polymers are crosslinked, i.e. the polymerization is carried out in the presence of compounds having at least two polymerizable groups which can be free-radically polymerized into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0 547 847, EP-A-0 559 476, EP-A-0 632 068, WO-A-93/21237, WO-A-03/104299, WO-A-03/104300, WO-A-03/104301 and DE-A-10331450, mixed acrylates which, as well as acrylate groups, comprise further ethylenically unsaturated groups, as described in DE-A-103 31 456 and DE-A-103 55 401, or crosslinker mixtures as described, for example, in DE-A-195 43 368, DE-A-196 46 484, WO-A-90/15830 and WO-A-02/32962.

Suitable crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described, for example, in EP-A-0 343 427. Suitable crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. In the process of the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred crosslinkers b) are polyethoxylated and/or -propoxylated glycerols which have been esterified with acrylic acid or methacrylic acid to di- or triacrylates, as described, for example, in DE-A 103 19 462. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 ppm by weight) in the water-absorbing polymer and the aqueous extracts of the water-absorbing polymers produced therewith have an almost unchanged surface tension (typically not less than 0.068 N/m) compared with water at the same temperature.

The amount of crosslinker b) is preferably from 0.01 to 1% by weight, more preferably from 0.05 to 0.5% by weight, most preferably from 0.1 to 0.3% by weight, all based on the monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The preparation of a suitable polymer and also further suitable hydrophilic ethylenically unsaturated monomers a) are described in DE-A-199 41 423, EP-A-0 686 650, WO-A-01/45758 and WO-A-03/104300.

Suitable reactors are kneading reactors or belt reactors. In the kneader, the polymer gel formed in the polymerization of an aqueous monomer solution is comminuted continuously by, for example, contrarotatory stirrer shafts, as described in WO-A-01/38402. The polymerization on the belt is described, for example, in DE-A-38 25 366 and U.S. Pat. No. 6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. 430.2-02 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes. In general, though, adequate venting and removal of the water vapor also still lead to an acceptable product. A very short drying time is generally advantageous with regard to color and product quality.

Thereafter, the dried hydrogel is ground and classified, and the apparatus used for grinding may typically be single- or multistage roll mills, preferably two- or three-stage roll mills, pin mills, hammer mills or vibratory mills.

The resulting polymer particles can then be post-crosslinked. Postcrosslinkers e) suitable for this purpose are compounds which comprise at least two groups which can form covalent bonds with the carboxylate groups of the polymers. Suitable compounds are, for example, alkoxysilyl compounds, polyaziridines, polyamines, polyamidoamines, di- or polyglycidyl compounds, as described in EP-A-0 083 022, EP-A-543 303 and EP-A-937 736, polyhydric alcohols, as described in DE-C-33 14 019, DE-C-35 23 617 and EP-A-450 922, or (-hydroxyalkylamides, as described in DE-A-102 04 938 and U.S. Pat. No. 6,239,230. Also suitable are compounds with mixed functionality, such as glycidol, 3-ethyl-3-oxetanemethanol (trimethylolpropaneoxetane), as described in EP-A-1 199 327, aminoethanol, diethanolamine, triethanolamine or compounds which form a further functionality after the first reaction, such as ethylene oxide, propylene oxide, isobutylene oxide, aziridine, azetidine or oxetane.

In addition, DE-A-40 20 780 describes cyclic carbonates, DE-A-198 07 502 2-oxazolidone and its derivatives such as N-(2-hydroxyethyl)-2-oxazolidone, DE-A-198 07 992 bis- and poly-2-oxazolidinones, DE-A-198 54 573 2-oxotetrahydro-1,3-oxazine and its derivatives, DE-A-198 54 574 N-acyl-2-oxazolidones, DE-A-102 04 937 cyclic ureas, DE-A-103 34 584 bicyclic amide acetals, EP-A-1 199 327 oxetanes and cyclic ureas, and WO-A-03/031482 morpholine-2,3-dione and its derivatives, as suitable postcrosslinkers e).

Preferred postcrosslinkers e) are oxazolidone and its derivatives, especially N-(2-hydroxyethyl)-2-oxazolidone.

The amount of postcrosslinker e) is preferably from 0.01 to 1% by weight, more preferably from 0.05 to 0.5% by weight, most preferably from 0.1 to 0.2% by weight, based on the polymer.

The postcrosslinking is typically carried out in such a way that a solution of the postcrosslinker e) is sprayed onto the hydrogel or the dry polymer particles. The spray application is followed by thermal drying, and the postcrosslinking reaction may take place either before or during drying.

The spray application of a solution of the crosslinker is preferably carried out in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige® mixers, Bepex® mixers, Nauta® mixers, Processall® mixers and Schugi® mixers.

The thermal drying is preferably carried out in contact dryers, more preferably shovel dryers, most preferably disk dryers. Suitable dryers are, for example, Bepex® dryers and Nara® dryers. Moreover, it is also possible to use fluidized bed dryers.

The drying can be effected in the mixer itself, by heating the jacket or blowing in warm air. Equally suitable is a downstream dryer, for example a tray dryer, a rotary tube oven or a heatable screw. It is also possible, for example, to utilize an azeotropic distillation as the drying process.

Preferred drying temperatures are in the range from 170 to 250° C., preferably from 180 to 220° C., and more preferably from 190 to 210° C. The preferred residence time at this temperature in the reaction mixer or dryer is preferably at least 10 minutes, more preferably at least 20 minutes, most preferably at least 30 minutes.

The water-absorbing polymer particles may additionally be aftertreated with at least one polyvalent cation f). Suitable cations f) are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred.

Typically, the polyvalent cation f) is used in the form of an aqueous solution. The concentration of the polyvalent cation f) in the aqueous solution is, for example, from 0.1 to 12% by weight, preferably from 0.5 to 8% by weight, more preferably from 1.5 to 4% by weight.

The amount of polyvalent cation f) is preferably from 0.001 to 0.25% by weight, more preferably from 0.005 to 0.2% by weight, most preferably from 0.01 to 0.15% by weight, based in each case on the polymer.

The polyvalent cations f) are preferably applied during the aftertreatment, in which case postcrosslinker e) and cation f) are preferably metered in via separate solutions.

The present invention further provides the polymers obtainable by the process according to the invention and also hygiene articles, especially diapers, which comprise them.

The process according to the invention enables the reliable transport of water-absorbing polymer particles in the region of dense stream delivery. Within the inventive operating range, there is a minimum of the mechanical transport loading and thus a minimum for the transport-related attrition of the water-absorbing polymer particles.

Methods:

The measurements should, unless stated otherwise, be carried out at an ambient temperature of 23±2° C. and a relative atmospheric humidity of 50±10%. The water-absorbing polymer particles are mixed thoroughly before the measurement.

Saline Flow Conductivity (SFC)

The saline flow conductivity of a swollen gel layer under pressure load of 0.3 psi (2070 Pa) is, as described in EP-A-0 640 330, determined as the gel layer permeability of a swollen gel layer of superabsorbent polymer, although the apparatus described on page 19 and in FIG. 8 in the aforementioned patent application was modified to the effect that the glass frit (40) is no longer used, the plunger (39) consists of the same polymer material as the cylinder (37) and now comprises 21 drillholes of equal size distributed uniformly over the entire contact surface. The procedure and the evaluation of the measurement remains unchanged from EP-A-0 640 330. The flow rate is recorded automatically.

The saline flow conductivity (SFC) is calculated as follows:

$$SFC[\text{cm}^3\text{s/g}]=(Fg(t=0)\times L0)/(d\times A\times WP),$$

where Fg(t=0) is the flow rate of NaCl solution in g/s, which is obtained by means of a linear regression analysis of the Fg(t) data of the flow determinations by extrapolation to t=0, L0 is the thickness of the gel layer in cm, d is the density of the NaCl solution in g/cm$^3$, A is the surface area of the gel layer in cm$^2$ and WP is the hydrostatic pressure over the gel layer in dyn/cm$^2$.

EXAMPLES

Example 1

A 38.8% by weight acrylic acid/sodium acrylate solution was prepared by continuously mixing water, 50% by weight sodium hydroxide solution and acrylic acid, such that the degree of neutralization was 71.3 mol %. The solids content of the monomer solution was 38.8% by weight. After the components had been mixed, the monomer solution was cooled continuously to a temperature of 29° C. by means of a heat exchanger and degassed with nitrogen.

The polyethylenically unsaturated crosslinker used is polyethylene glycol-400 diacrylate (diacrylate of a polyethylene glycol with a mean molar mass of 400 g/mol). The use amount was 2 kg per t of monomer solution.

To initiate the free-radical polymerization, the following components were used: hydrogen peroxide (1.03 kg (0.25% by weight) per t of monomer solution), sodium peroxodisulfate (3.10 kg (15% by weight) per t of monomer solution), and ascorbic acid (1.05 kg (1% by weight) per t of monomer solution).

The throughput of the monomer solution is 18 t/h.

The individual components are metered continuously into a List Contikneter reactor with capacity 6.3 m³ (from List, Arisdorf, Switzerland) in the following amounts:

| | |
|---|---|
| 18 t/h | of monomer solution |
| 36 kg/h | of polyethylene glycol-400 diacrylate |
| 74.34 kg/h | of hydrogen peroxide solution/sodium peroxodisulfate solution |
| 18.9 kg/h | of ascorbic acid solution |

At the end of the reactor, from 750 to 900 kg/h of removed undersize with a particle size of less than 150 μm were additionally metered in.

At the feed, the reaction solution had a temperature of 23.5° C. The reactor was operated with a rotational speed of the shafts of 38 rpm. The residence time of the reaction mixture in the reactor was 15 minutes.

In the resulting product gel, a residual acrylic acid content of 0.6% by weight (based on solids content) and a solids content of 45.0% by weight were found analytically.

After polymerization and gel comminution, the aqueous polymer gel was placed onto a belt dryer. In total, 18.3 t/h of aqueous polymer gel with a water content of 55% by weight were dried. The gel was applied to the conveyor belt of the dryer from a height of 30 cm by means of a swivel belt. The height of the gel layer was approx. 10 cm.

The belt speed of the dryer belt was 0.02 m/s and the residence time on the dryer belt was approx. 37 minutes.

The dried hydrogel was ground and sieved. The fraction with particle size from 150 to 800 μm was postcrosslinked.

The postcrosslinker solution was sprayed onto the polymer particles in a Schugi® mixer. The postcrosslinker solution was a 1.2% by weight solution of ethylene glycol diglycidyl ether in propylene glycol/water (weight ratio 1:2). Based on the polymer particles, 5% by weight of solution were sprayed on. This was followed by drying at 150° C. for 60 minutes and postcrosslinking.

After removal of the oversize formed during the postcrosslinking, the water-absorbing polymer particles were delivered pneumatically. The delivery line used was a smooth pipeline of aluminum with a length of 153 m and an internal diameter of 108.5 mm. The delivery line consisted of two horizontal and two vertical sections, the sections having been connected by curves. The vertical elevation was a total of 10 m.

The delivery output was 5800 kg/h of water-absorbing polymer particles, the delivery air rate was 320 kg/h and the gas rate was 3.2 m/s at the start of the delivery line and 8 m/s at the end of the delivery line. The pressure in the delivery line was from +1500 to 0 mbar, based on the ambient pressure. The delivery material loading was 18 kg/kg and the Froude number at the start of the delivery was 3.1.

The particle size distribution of the water-absorbing polymer particles (SAP) was determined by photooptical detection. The results are summarized in Table 1.

Example 2

The procedure was the same as for Example 1. The initial gas rate was lowered to 1.2 m/s via the delivery gas pressure.

Example 3

The procedure was the same as for Example 1. The initial gas rate was increased to 5.8 m/s via the delivery gas pressure.

TABLE 1

Results

| | Percentage of the particular particle size | | | |
|---|---|---|---|---|
| Particle size [μm] | SAP without delivery | Example 1 V = 3.2 m/s | Example 2 V = 1.2 m/s | Example 3 V = 5.8 m/s |
| 0-90 | 0.0 | 0.0 | 0.1 | 0.0 |
| 91-120 | 0.0 | 0.0 | 0.5 | 0.0 |
| 121-150 | 0.1 | 0.1 | 0.5 | 0.1 |
| 151-200 | 0.7 | 0.9 | 1.1 | 1.8 |
| 201-250 | 2.5 | 2.5 | 6.5 | 5.5 |
| 251-300 | 4.0 | 4.0 | 5.9 | 5.6 |
| 301-350 | 5.9 | 6.2 | 8.5 | 6.0 |
| 351-400 | 14.9 | 14.9 | 12.8 | 13.8 |
| 401-500 | 19.3 | 18.9 | 14.4 | 15.9 |
| 501-600 | 19.0 | 18.3 | 15.7 | 17.0 |
| 601-700 | 16.6 | 16.3 | 15.8 | 17.5 |
| 701-800 | 14.9 | 12.1 | 12.1 | 12.3 |
| 801-900 | 2.1 | 5.3 | 5.6 | 3.9 |
| 901-1000 | 0.0 | 0.5 | 0.5 | 0.7 |
| 1001-1400 | 0.0 | 0.0 | 0.0 | 0.0 |

What is claimed is:

1. A process for pneumatic dense stream delivery of water-absorbing polymer particles comprising:
   supplying a delivery material comprising water-absorbing polymer particles to a delivery line; and
   supplying gas to the delivery line at an initial gas rate in the delivery line is from 1 to 6 m/s so that a delivery material loading in the delivery line is from 5 to 75 kg/kg, the delivery material loading being the quotient of delivery material mass flow rate and gas mass flow rate, to deliver the water-absorbing polymer particles in a dense stream.

2. The process according to claim 1, wherein the pneumatic delivery is via a tube having a tube diameter is from 3 to 30 cm.

3. The process according to claim 1, wherein the tube diameter increases in delivery direction.

4. The process according to claim 1, wherein a pressure in the delivery line with respect to atmospheric pressure is from 0.8 bar to 10 bar.

5. The process according to claim 1, wherein the polymer particles have a water content of less than 10% by weight.

6. The process according to claim 1, wherein at least 90% of the polymer particles have a particle diameter of less than 1000 μm.

7. The process according to claim 1, wherein the polymer particles are based on polyacrylic acid.

8. The process according to claim 1, wherein the polymer particles are based on crosslinked polyacrylic acid.

9. The process according to claim 1, wherein the polymer particles are based on partly neutralized polyacrylic acid.

10. The process according to claim 1, wherein the initial gas rate in the delivery line is from 1.5 to 6 m/s.

11. The process according to claim 10, wherein the initial gas rate in the delivery line is from 2 to 5 m/s.

12. The process according to claim 11, wherein the initial gas rate in the delivery line is from 3 to 4 m/s.

13. The process according to claim 1, wherein the delivery line comprises a fluid advanced line, and the initial gas rate in the delivery line is from 2 to 6 m/s.

14. The process according to claim 13, wherein the initial gas rate in the delivery line is from 3 to 5.5 m/s.

15. The process according to claim 14, wherein the initial gas rate in the delivery line is from 4 to 5 m/s.

16. The process according to claim 1, wherein the delivery material loading in the delivery line is from 10 to 50 kg/kg.

\* \* \* \* \*